Sept. 2, 1958      A. G. FOX      2,850,701

NONRECIPROCAL WAVE TRANSMISSION COMPONENT

Filed Aug. 7, 1953      3 Sheets—Sheet 1

INVENTOR
A. G. FOX
BY Hugh S. Wertz
ATTORNEY

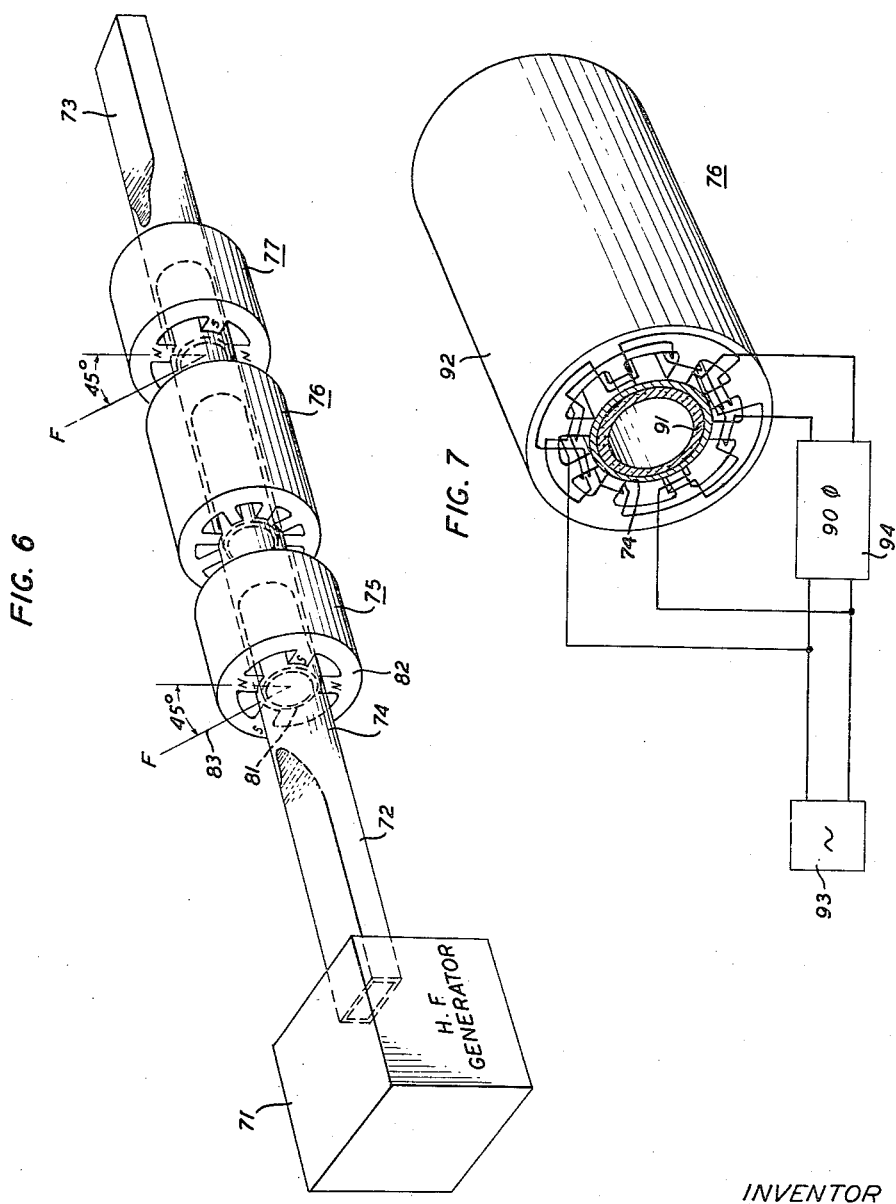

Sept. 2, 1958  A. G. FOX  2,850,701
NONRECIPROCAL WAVE TRANSMISSION COMPONENT
Filed Aug. 7, 1953  3 Sheets-Sheet 3

INVENTOR
A. G. FOX
BY Hugh S. Wertz
ATTORNEY

2,850,701
Patented Sept. 2, 1958

2,850,701

NONRECIPROCAL WAVE TRANSMISSION COMPONENT

Arthur G. Fox, Rumson, N. J., assignor to Bell Telephone Laboratories, Incorporated, New York, N. Y., a corporation of New York Application August 7, 1953, Serial No. 372,831

17 Claims. (Cl. 333—6)

This invention relates to birefringent wave guide components and, more specifically, to birefringent wave guide components which are also nonreciprocal.

A birefringent wave guide structure is one in which waves polarized in one direction travel faster than waves polarized in another direction. A well known birefringent wave guide device is a wave guide having an elliptical cross section in which waves polarized parallel to the widest cross-sectional dimension travel at a different speed than those polarized perpendicular thereto.

It has also been proposed to use ferromagnetic material in certain specific structural arrangements to obtain birefringence (see applications of E. H. Turner, Serial No. 339,289, filed February 27, 1953 and of A. G. Fox, Serial No. 304,609, filed August 15, 1952, now United States Patent 2,787,765, issued April 2, 1957). Although these arrangements have proved satisfactory for some purposes, the effects involved have been somewhat weaker than might be desired and tend to require unduly large magnetic fields or overly long birefringent sections of wave guide to secure the desired effects.

One object of the present invention is to increase the birefringent effect of ferromagnetic birefringent devices.

For certain types of equipment it is desirable to change the orientation of the fast and slow axes of the birefringent wave guide component at a moderately high rate of speed. One arrangement for accomplishing this is a motor driven rotatable section of oval wave guide. This mechanical arrangement has many obvious disadvantages and is clearly not suitable for high speed rotation of the axes of birefringence.

Accordingly, another object of the present invention is to increase the speed at which the axes of birefringence of a birefringent wave guide component may be rotated.

In accordance with the invention, it has been determined that a round wave guide can be made birefringent for electromagnetic waves having a transverse component by the use of a generally cylindrical ferromagnetic structure having at least four zones of successively opposite magnetic polarizations spaced around the circumference of the structure. In accordance with an exemplary embodiment of the invention illustrated in the drawings, a round wave guide having a hollow cylinder of ferrite within the wave guide and adjacent its inner surface, and having a four pole magnet mounted outside the wave guide energizing the ferrite cylinder, has been found to exhibit a strong birefringent effect for electromagnetic waves of the dominant $TE_{11}$ mode.

Other objects and certain additional features and advantages will become apparent in the course of the detailed description of the drawings.

Fig. 6 is a continuous phase shifting device employing birefringent elements of the type shown in Figs. 1 and 5;

Fig. 7 is an enlarged perspective view showing the wiring of one of the elements of Fig. 6;

Figure 1:
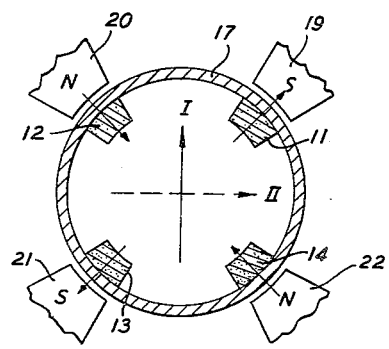
Fig. 1 is a cross-sectional view of a section of wave guide which exhibits birefringent and nonreciprocal properties in accordance with the invention.

Referring more particularly to the drawings, Fig. 1 shows by way of example and for purposes of illustration a birefringent nonreciprocal wave guide component in accordance with the invention. In this arrangement four small elements of ferrite 11, 12, 13 and 14 are located within a circular conducting wave guide 17 adjacent to the inner surface thereof and spaced uniformly around its periphery. Suitable magnetic pole pieces 19, 20, 21 and 22 are located immediately outside the wave guide 17 opposite the ferromagnetic elements 11 through 14. These pole pieces 19 through 22 are of alternate positive and negative polarity and may of course be energized by either an electromagnet or by permanent magnets. As will be developed in the course of discussion of Figs. 2 through 4, a wave guide component having this cross section is birefringent for electromagnetic waves of the dominant mode, and is nonreciprocal for the two directions of transmission. Thus, electromagnetic waves of the dominant or $TE_{11}$ mode polarized vertically as indicated by the solid arrow I will pass through the wave guide at a substantially different rate of propagation than similar waves having their electric vector polarized parallel to the dashed arrow II, and these fast and slow axes of propagation will be reversed for the opposite direction of transmission through the wave guide component.

Figure 2:
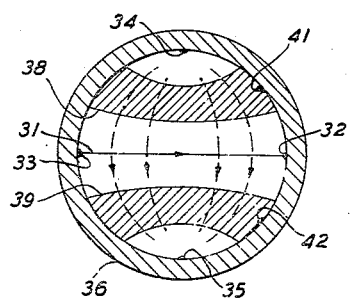
Figs. 2 and 3 are wave patterns of the dominant mode in a cylindrical wave guide.
Figure 3:
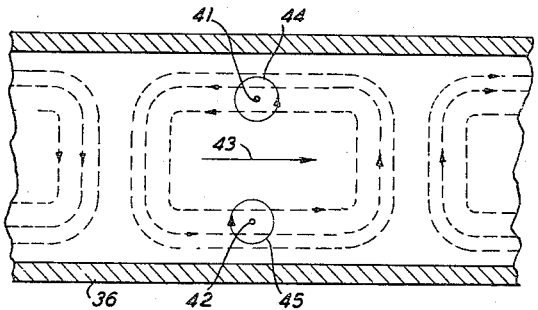

Figs. 2 and 3 show schematically the configuration of the $TE_{11}$ mode in a circular wave guide. The direction of polarization of the wave is designated in terms of the direction of the electric field vector 31. As may be observed by a study of Figs. 2 and 3, the high frequency magnetic field vector is transversely polarized at each point along the diametral line 31, which indicates the polarization of the electric vector. The two points 32 and 33 are located where the line 31 intersects the inner surface of the cylindrical wave guide 36. At points 34 and 35, which are 90 degrees displaced around the periphery of the wave guide 36 from points 32 and 33, the high frequency magnetic vector is longitudinally polarized. With longitudinal polarization at the top 34 and bottom 35 of the cylindrical wave guide and transverse polarization along a horizontal diametral line, there will be an upper region 38 and a lower region 39 about half way between the zones of transverse and longitudinal polarization in which the high frequency magnetic vector is substantially circularly polarized. On the inner surface of the cylindrical wave guide 36, half way between the point 32 on the right hand side of the guide and point 34 at the top of the guide is the point 41, and it is located within the upper zone 38 of substantial circular polarization. Similarly, point 42 is located in the lower region 39 of circular polarization on the inner surface of the wave guide 36 about half way between point 32 at the right hand side of the wave guide and point 35 at the bottom of the circular wave guide.

The nature of the magnetic field at points 41 and 42 in the regions of circular polarization 38 and 39, respectively, and at the wall of the circular wave guide 36 will now be examined in greater detail by reference to Fig. 3, which is a view of Fig. 2 from the right, with the half of the wave guide to the right removed. In Fig. 3 the high frequency magnetic field is illustrated by the closed dashed line loops having arrows indicating the direction of the magnetic field. The arrow 43 indicates the left to right direction of propagation of the entire electromagnetic field. At the point 41 as the electromagnetic field configuration moves past this point, the magnetic vector is first pointing to the left (the position shown in Fig. 3), 90 degrees later will be pointing downwardly, and another 90 degrees later will be pointing to the right. This counterclockwise movement of the circularly polarized vector at point 41 is indicated by the small circle 44 encircling point 41 and having an arrow pointing in the counterclockwise direction. Similarly, the circle 45 indicates the clockwise rotation of the magnetic vector at point 42. In addition it is apparent that a reversal of the direction of propagation of the electromagnetic field configuration will reverse the direction of rotation of the circularly polarized components of the high frequency magnetic field at points 41 and 42.

Figure 4:
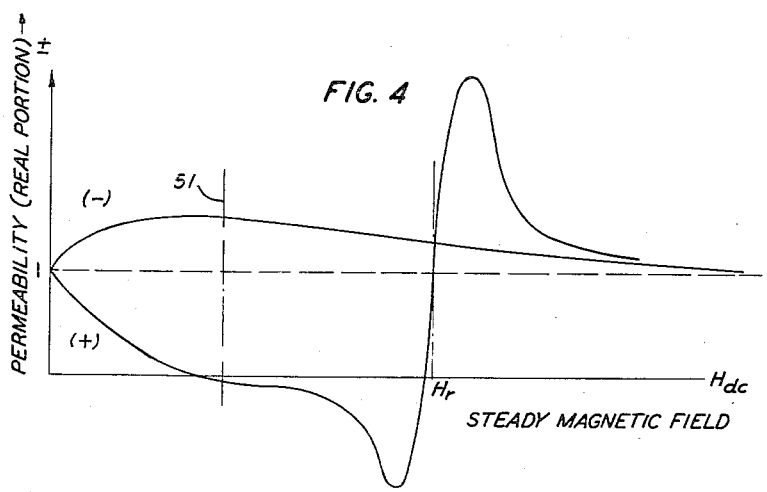
Fig. 4 is a plot of permeability vs. steady magnetic field for ferromagnetic materials which are employed in the devices of the present invention.

The plots of Fig. 4 illustrate the difference in permeability for positive and negative circularly polarized high frequency waves in a polarized medium of paramagnetic material. By definition, a positive circular polarization indicates a rotation of the magnetic vector clockwise when looking along a north to south pole steady biasing magnetic vector. These plots are for high frequency waves in which the plane of the rotating magnetic intensity is at right angles to the steady biasing magnetic field, and may be derived from a mathematical analysis of D. Polder which appeared in vol. 40, pages 99 through 115, of the January 1949 issue of The Philosophical Magazine. The feature of these plots which is important for an understanding of the present invention is the wide divergence of the real portion of the permeabilities for the positive and negative circularly polarized components of the high frequency magnetic field.

One physical explanation which has been advanced to explain this phenomenon involves the assumption that the ferromagnetic material contains unpaired electron spins which tend to line up with the applied magnetic field. These spins and their associated moments can be made to precess about the line of the steady magnetic field, keeping an essentially constant component of magnetic moment in the direction of the steady magnetic field but providing a magnetic moment which may rotate in a plane normal to this direction. These magnetic moments have a tendency to precess in one angular sense, but strongly resist rotation in the opposite sense. This tendency of a spinning element to consistently precess in one angular direction is familiar to anyone who has watched a top wobble before stopping. Considering the interaction between the oppositely polarized components of high frequency magnetic intensity and the magnetic moments, it is clear that one of the circularly polarized components will be rotating in the easy angular direction of precession of the magnetic moments and the other component will be rotating in the opposite direction. When the high frequency magnetic intensity is rotating in the same sense as the preferred direction for precession of the magnetic moment, it will couple strongly with the magnetic moment and drive it into precession. When the high frequency magnetic intensity is rotating in the opposite angular direction, however, very little coupling or interaction between the high frequency magnetic intensity and the magnetic moments takes place.

Now, correlating the discussion of Figs. 2 through 4 with the device of Fig. 1, a wave having its electric vector polarized in the horizontal direction indicated by the dashed arrow II will be considered. With the electromagnetic wave propagating into the plane of the paper in Fig. 1, the ferromagnetic element 14 will be located in a position corresponding to that of point 42 in Figs. 2 and 3 and, looking away from the north pole 22, a clockwise or positive circular polarization of the high frequency magnetic field will be observed. Similarly, at ferromagnetic elements 11 through 13 the polarization as viewed along the direction of the north to south polarizing arrows will also be clockwise or positive. Referring to Fig. 4, it may be observed that the permeability at moderate magnetization levels such as indicated by the dotted line 51 is substantially less than the unity value it would have in the absence of the ferromagnetic elements, and the velocity of propagation is correspondingly increased. When the plane of polarization of the incident wave is shifted 90 degrees to the position indicated by the solid arrow I representing the electric vector, the circularly polarized high frequency magnetic vectors at each element 11 through 14 will now be rotating counterclockwise as viewed along the north to south steady biasing vectors. This corresponds to the negative (—) plot of Fig. 4 which shows an increase in permeability and a corresponding decrease in speed of propagation as compared with the unity value it would have in the absence of the ferromagnetic elements. The device of Fig. 1 is, therefore, a birefringent wave guide element having a high speed axis of propagation II and a low speed axis of propagation I for waves moving into the plane of the paper.

For waves moving out of the paper, the analysis of Fig. 3 indicated that the direction of rotation of the circularly polarized components of the high frequency magnetic field would be reversed. Therefore, $TE_{11}$ electromagnetic waves having their electric vector parallel to horizontal arrow II of Fig. 1 will propagate at a lower speed than those polarized parallel to the vertical arrow I. In addition to its birefringent properties, the foregoing analysis shows that the device illustrated in Fig. 1 is also nonreciprocal.

The elements 11 through 14 of the device of Fig. 1 are made from a paramagnetic material which has low conductivity. The conductivity ranges should be moderately low in order to prevent undue absorption from the electromagnetic field, and the samples should preferably have a resistance greater than 100 ohm-centimeters, although operable devices could be made with resistivities as low as 10 ohm-centimeters. Any of a number of ferromagnetic materials which each comprise an iron oxide in combination with one or more bivalent metals, such as nickel, magnesium, zinc, manganese or other similar material have proved to be satisfactory. These materials combine with the iron oxide in a spinel structure and are known as ferromagnetic spinels or as polycrystalline ferrites. In accordance with the usual practice, these materials are first powdered and then molded with a small percentage of plastic material such as teflon or polystyrene. As a specific example, the elements 11 through 14 may be a cylinder of nickel-zinc ferrite of the approximate chemical formula $(Ni_{.3}Zn_{.7})Fe_2O_3$ prepared as noted above. In addition, commercially available samples of ferrite, and finely powdered conducting ferromagnetic dust in an insulating binder may be employed. By way of inclusion but not of limitation, the phrase "paramagnetic material having low conductivity" is to be construed as applying to any of the foregoing types of materials. In addition, as employed in the present application and claims, the term "gyromagnetic medium" is intended to apply to all materials having magnetic properties of the type disclosed in the above-mentioned article by Polder, and as discussed above in conjunction with Figs. 1 through 4.

Figure 5:
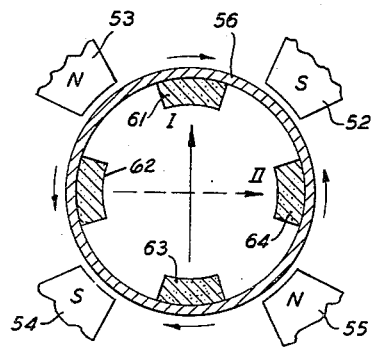
Fig. 5 is a cross-sectional view of another form of birefringent wave guide component.

Fig. 5 is a cross-sectional view of another non-reciprocal birefringent structure, which is complementary to the structure of Fig. 1. In this structure of Fig. 5, four magnetic pole pieces 52 through 55 are spaced around the wave guide 56 at 90 degree intervals to magnetize the paramagnetic elements 61 through 64 with a peripheral field as indicated by the arrows associated with each element. These magnetic elements may be mounted on the inner surface of the circular wave guide 56, and have their centers spaced approximately half way between each adjacent pair of magnet pole pieces. It would be desirable, for maximum interaction, to locate the paramagnetic elements in zones 38, 39 as indicated in Fig. 2 where the polarization is substantially circular. However, for ease of mechanical support the elements 61 through 64 have been located against the inner surface of the wave guide 56, in a region where the high frequency magnetic field is elliptical, and thus has substantial circularly polarized components for interaction with the polarized ferromagnetic material. Considering a dominant electromagnetic wave polarized in the horizontal plane as indicated by the dashed arrow II in Fig. 5, the circularly polarized components of the high frequency magnetic vector will be polarized in the clockwise direction as observed along a north to south biasing magnetic vector in paramagnetic elements 61 and 63 for propagation into the plane of the paper. The elements 62 and 64 will have substantially no effect on the horizontally polarized dominant mode because the steady magnetization is parallel to the high frequency magnetic vectors. The clockwise or positive rotation corresponds to decreased permeability as indicated by the intersection of the positive (+) curve and the vertical line 51 in Fig. 4 and this means that the speed of propagation will be increased for the horizontal (II) polarization. Similarly, it will be decreased for vertical (I) polarization by the action of ferromagnetic elements 62 and 64. Further, these mutually orthogonal axes of fast and slow propagation will be reversed for propagation in the opposite direction (out of the plane of the paper).

Now, comparing the structures of Figs. 1 and 5, it is clear that they may be combined to form a single hollow cylinder of paramagnetic material energized by the same type of four pole magnetic structure shown in both Figs. 1 and 2. This composite structure, which is used as an element of the devices of Figs. 6 through 8, exhibits a high degree of birefringence and nonreciprocity through the combination of the effects noted in connection with Figs. 1 through 5 and the enhanced magnetic field present in a closed magnetic circuit. A solid cylinder of paramagnetic material could also be employed, but is not entirely satisfactory under all conditions, inasmuch as the high dielectric constant of a solid ferrite cylinder increases the electrical size of the wave guide and tends to favor the excitation of undesired higher order modes. When a hollow cylinder of ferrite is used, however, these effects are minimized because only a relatively small cross-sectional area of the guide is filled with the high dielectric constant material.

Certain specific uses of the birefringent non-reciprocal unit are shown in Figs. 6 through 9, and they will be discussed briefly hereinafter.

Fig. 6 is an isometric view of a continuous microwave phase shifting unit employing several birefringent units. Initially, it might be noted that this arrangement is very similar to that shown in Fig. 1 of my application Serial No. 304,609 mentioned hereinbefore. The overall purpose of these units is to increase the frequency of a microwave signal by a fixed amount. The major components of the device of Fig. 6 are the high frequency generator 71, the input and output rectangular wave guides 72 and 73, the central cylindrical wave guide section 74, the 90 degree linear-to-circular polarization birefringent element 75, the variable 180 degree birefringent unit 76, and the circular-to-linear polarization element 77.

Considering the birefringent unit 75, it is made up of the paramagnetic element 81 within the wave guide 74, and the four pole magnetic core 82 mounted on the wave guide 74, and may be considered to be a composite of the birefringent structures of Figs. 1 and 5. In practice, the cylinder 81 may be made of ferrite and should be tapered at the ends to minimize reflections. With the opposed south magnetic poles in the horizontal plane and the opposed north magnetic poles of the magnet 82 in the vertical plane, the axis of fast propagation will be oriented 45 degrees counterclockwise from vertical as indicated by line 83 labeled "F." As the dominant electromagnetic mode in the rectangular guide is launched in the circular guide, it will be transformed into the dominant circular wave guide mode and will be vertically polarized.

Within the birefringent unit 75, the vertically polarized wave may be considered to be split into two components, one parallel to the fast axis of propagation 83 and one parallel to the slow axis of propagation which is 90 degrees displaced from this fast axis of propagation. The component parallel to the fast axis will be speeded up and the component parallel to the slow axis will be slowed down so that along the length of the birefringent element there will be a progressive displacement of one wave configuration relative to the other. Either empirically or by calculation, the length of the birefringent unit 75 is determined so that the displacement of these two waves is 90 degrees after traversing its length. This corresponds to a quarter wave birefringent plate in the field of optics and results in a circularly polarized electromagnetic wave. A circularly polarized electromagnetic wave can be considered to be a linearly polarized vector which is periodically rotating about the axis of the wave guide 74. Now, if a circular-to-linear birefringent plate similar to unit 77 were placed immediately after unit 75 (omitting unit 76), the rotating vector representing the circularly polarized wave would be transformed back to a linearly polarized wave of the same frequency as that applied to the input of unit 75. However, if the speed of rotation of the vector representing the polarized electromagnetic wave were increased between the two 90 degree birefringent units the output linearly polarized electromagnetic wave would clearly be increased in frequency.

The central birefringent unit 76 is the means by which the speed of rotation of the rotating vector representing the circularly polarized electromagnetic wave is increased. This unit 76 which is interposed between the 90 degree birefringent units 75 and 77 is essentially a four pole 180 degree birefringent unit which is arranged so that the axes of birefringence can be continuously rotated in one angular sense without mechanical rotation of the magnet structure.

In addition to Fig. 6, reference should be made to Fig. 7 of the drawings for another view of the magnet core of the unit 76 and its associated electrical circuits. The unit 76 is made up of a hollow cylinder 91 of paramagnetic material which may, for example, be a polycrystalline ferrite, within and supported by the wave guide 74, and an outer magnetic core structure 92 provided with eight spaced pole pieces. In order to rotate the axis of birefringence, a rotating magnetic field is applied to the ferrite by the eight pole magnet structure 92 which is in turn energized by the source of alternating current 93. A first set of four alternate pole pieces are energized directly from the source 93, with a first diametral pair of these four poles being wound in opposition to the second pair. The second set of four poles are coupled to the source 93 through a 90 degree phase shifting unit 94 and are wound so as to produce a rotating magnetic field which is much the same as that established in an alternating current motor.

The unit 76 is, therefore, a 180 degree birefringent component in which the axes of birefringence are continuously rotating at a frequency corresponding to the frequency of the alternating current source 93. As set forth in greater detail in my copending application Serial No. 304,609, the instantaneous angle of the output vector of the circularly polarized wave passing through a 180 degree birefringent unit will depend upon the relationship of the instantaneous angle of the input vector with respect to the axes of birefringence of the unit. Specifically, by rotating the axes of birefringence by an angle $\theta$, the instantaneous output polarization will be rotated by an angle $2\theta$. Therefore, after being changed back from circular to linear polarization by the unit 77, the output electromagnetic wave at wave guide 73 will have a higher frequency than that applied at the input wave guide 72 by an amount equal to the frequency of the source of alternating current 93.

Units of the type shown in Fig. 6 are particularly useful in microwave testing systems where bridge circuits are employed. In this type of system, the high frequency generator 71 energizes one branch of the bridge directly and the other branch via the units 75, 76, and 77. After application of one of the branch signals to the test circuit, the two signals are heterodyned and the resulting audio frequency (equal to the frequency of source 93) may be readily amplified and measured by audio equipment.

Figures 8, 9:
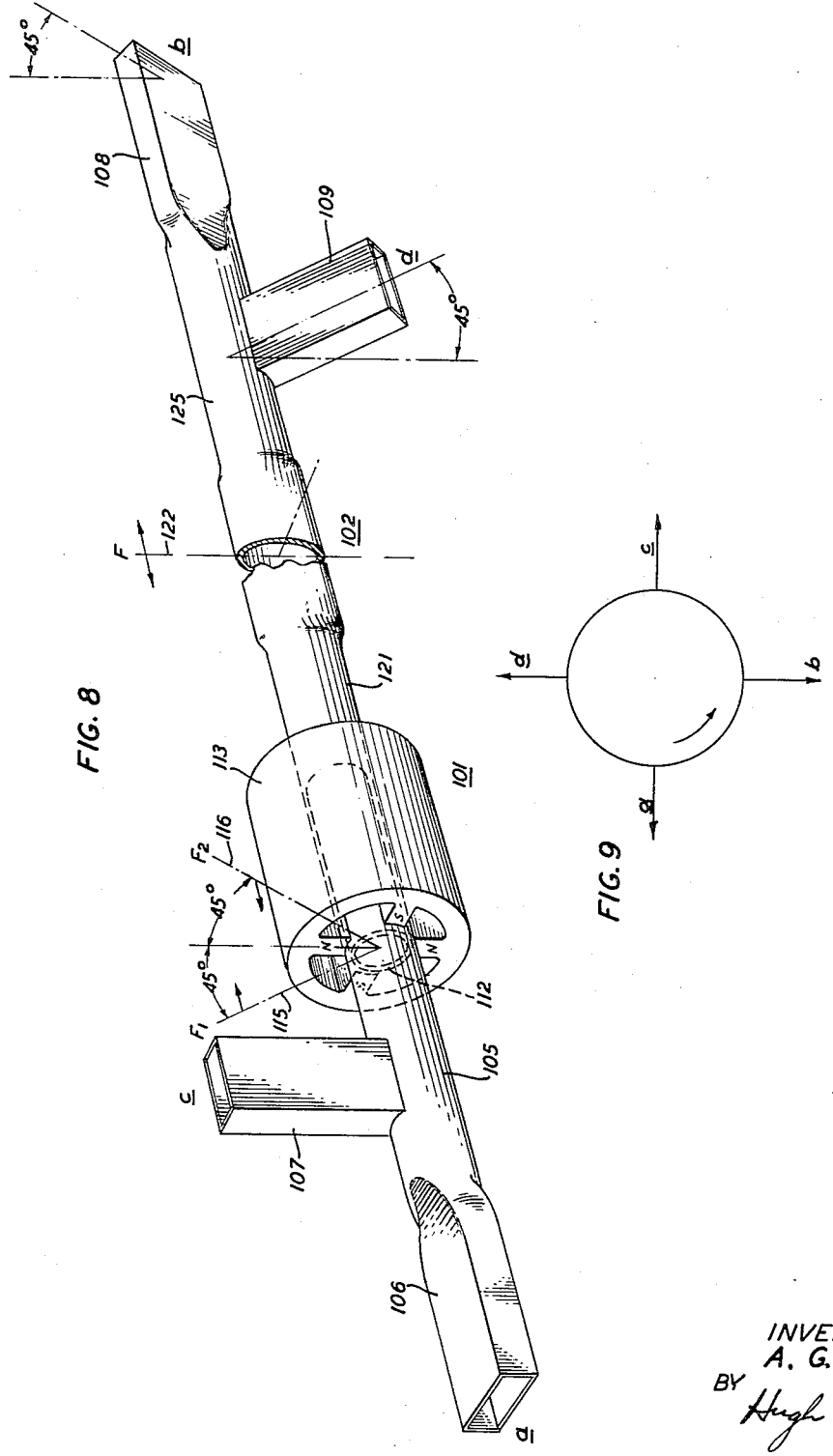
Fig. 8 illustrates a four terminal circulator employing a nonreciprocal birefringent element.
Fig. 9 is a simple diagram indicating the mode of operation of the structure of Fig. 8.

In Fig. 8 a nonreciprocal four terminal wave guide component of the type known as a circulator is disclosed. From an overall operational viewpoint the circulator action is diagrammatically illustrated in Fig. 9. Thus, energy applied to terminal $a$ appears at terminal $b$, energy applied at terminal $b$ appears not at terminal $a$ as would be expected for a reciprocal transducer but at terminal $c$; similarly, energy applied at terminal $c$ appears at $d$ and energy applied at $d$ appears at $a$. From an overall structural viewpoint the device consists of two pairs of wave guide terminals separated by a nonreciprocal 90 degree birefringent unit 101 and a reciprocal 90 degree birefringent unit 102, each pair of wave guide terminals coupling to energy polarized in mutually orthogonal planes.

In greater detail, the circulator of Fig. 8 comprises a circular wave guide 105 which tapers smoothly and gradually from its left hand end into a rectangular wave guide 106, and which is joined near said end by a second rectangular guide 107 in a shunt or H-plane junction. The rectangular wave guides 106 and 107 will accept and support only plane waves in which the component of the electric vector, which determines the plane of polarization of the wave, is consistent with the dominant $TE_{10}$ mode in the rectangular wave guides. Likewise, the dimension of the circular guide 105 is preferably chosen so that only the several polarizations of the dominant $TE_{11}$ mode can be propagated. By means of the smooth transition from the rectangular cross section of guide 106 to the circular cross section of guide 105, the $TE_{10}$ mode, which has its electric vector polarized parallel to the narrow dimension of the rectangular cross section of guide 106, may be coupled to and from the $TE_{11}$ mode in circular guide 105 which has a similar or a parallel polarization. No other polarization of wave energy in guide 105 will be coupled to any substantial extent to the polarization selective terminal 106. Guide 107 is physically oriented with respect to guides 105 and 106 so that the $TE_{10}$ mode in guide 107 is coupled by way of the shunt plane junction between the rectangular cross section of guide 107 and the circular cross section of guide 105 into the particular polarization of the $TE_{11}$ mode in guide 105 which is perpendicular to that of the $TE_{11}$ mode with which terminal 106 couples. Thus, guides 106 and 107 comprise a pair of polarization-selective connecting terminals by which wave energy in two orthogonal $TE_{11}$ mode polarizations may be coupled to and from one end of guide 105. Furthermore, these guides comprise a pair of conjugately related terminals or branches inasmuch as a wave launched in one will not appear in the other. At the other end of the circular wave guide 105 another pair of conjugately related terminals 108 and 109, corresponding to rectangular wave guides 106 and 107, respectively, serve to couple to mutually orthogonal polarizations of the $TE_{11}$ mode.

The nonreciprocal 90 degree birefringement unit 101 is made up of the hollow ferrite cylinder 112 inside the circular wave guide 105, and has a four pole magnet structure 113 mounted on the circular wave guide to polarize the ferrite tube. The opposed south poles of the magnet structure 113 are in a horizontal plane and establish a fast axis of propagation for electromagnetic waves traveling from left to right which is oriented 45 degrees counterclockwise of vertical as indicated by the line 115 in Fig. 7. Because of the nonreciprocal nature of the unit 101, the fast axis of birefringence for propagation from right to left will be displaced 90 degrees from line 115 and is indicated by line 116.

When a linearly polarized wave is applied to a 90 degree birefringent unit at 45 degrees with respect to the fast axis of birefringence, it becomes circularly polarized at the output from said unit, and the direction of circular polarization depends on whether the polarization of the applied wave is oriented 45 degrees clockwise or counterclockwise with respect to the fast axis of birefringence. If the applied wave is 45 degrees clockwise with respect to the fast axis, the resulting circularly polarized wave will be rotating in the positive or clockwise sense. Similarly if the polarization of the electric vector of the applied electromagnetic wave is located 45 degrees counterclockwise with respect to the fast axis of birefringence, the output wave will be circularly polarized in the negative or counterclockwise angular direction. Furthermore, if a circularly polarized wave is applied to a 90 degree birefringent unit, the resulting linearly polarized wave will be oriented 45 degrees clockwise or counterclockwise with respect to the fast axis of birefringence depending on whether the applied circularly polarized energy is counterclockwise or clockwise, respectively.

Applying these principles to electromagnetic waves passing through the circulator, vertically polarized waves originating at terminal $a$ and traveling from left to right in wave guide 106 will now be considered. These waves are 45 degrees clockwise with respect to the fast axis 115 ($F_1$) and thus will yield a clockwise or positive circularly polarized wave at point 121 between the two units 101 and 102. The fast axis 122 of the oval reciprocal, 90 degree birefringent unit 102 is across the broadest axis of the oval wave guide, and may be oriented at any desired angle with respect to the structure to the left of point 121. With the fast axis 122 of the unit 102 located vertically the linearly polarized wave at point 125 at the right hand end of wave guide 105 beyond unit 102, will be polarized in a plane shifted 45 degrees counterclockwise with respect to a vertical line, and will thus be accepted by the rectangular guide 108 which is terminal $b$ of the circulator.

Proceeding in the opposite direction and considering all angles and polarizations as viewed from right to left, the linearly polarized wave originating at $b$ will be oriented 45 degrees clockwise with respect to the fast axis 122 of the reciprocal unit 102 and will thus result in a positive or clockwise polarized wave at point 121. When this positive circularly polarized wave is applied to unit 101 the resulting linearly polarized wave will be located 45 degrees counterclockwise (as viewed from right to left) from the fast axis 116 ($F_2$), or in the horizontal plane, and thus will be coupled to wave guide 107 which is terminal $c$ of the circulator. Similarly energy applied to the circulator at terminal $c$ will appear at wave guide 109 which is terminal $d$ of the circulator, and energy applied at terminal $d$ will appear at terminal $a$ of the circulator. This circulator action is represented schematically by the diagram of Fig. 9.

In addition to the other applications noted hereinbefore, the application of S. E. Miller, Serial No. 362,193, filed June 17, 1953, and assigned to the assignee of the present application, is directed to closely related subject matter.

It is to be understood that the above-described arrangements are illustrative of the application of the principles of the invention. Numerous other arrangements, such as the use of other known types of wave-guiding structures or permanently magnetized active elements, may be devised by those skilled in the art without departing from the spirit and scope of the invention.

What is claimed is:

1. In a nonreciprocal birefringent wave guide component, a hollow substantially cylindrical conducting wave guide having a right circular section, a cylindrical element of gyromagnetic material of low conductivity located within said wave guide, and means for magnetically polarizing said element with a radial field at four peripheral regions spaced at substantially 90 degrees to one another, said magnetic field being inward at two diametrally opposed regions and outward at the other two regions.

2. In a nonreciprocal birefringent wave guide component for use with the dominant mode, a hollow substantially cylindrical conducting wave guide having a right circular section, a hollow element of paramagnetic material of low conductivity located within said wave guide, and means for magnetically polarizing said hollow element with a radial field at four peripheral regions spaced at substantially 90 degrees to one another, said magnetic field being inward at two diametrally opposed regions and outward at the other two regions.

3. In combination, a circular hollow pipe type wave guiding structure having a longitudinal axis, a hollow element of ferrite located substantially symmetrically with respect to said axis in the path of waves guided by said wave guiding structure, and means for magnetically polarizing said ferrite element with a radial field at four peripheral regions spaced at substantially 90 degrees to one another, said magnetic field being inward at two diametrally opposed regions and outward at the other two regions.

4. In combination, an electromagnetic wave guide for the propagation of polarized electromagnetic waves, a longitudinal axis centrally located with respect to said wave guide, a gyromagnetic structure disposed in the path of waves guided by said wave guide and substantially symmetrically located with respect to said axis, and means for inducing four distinct magnetic poles of alternate polarity around the perimeter of and in said gyromagnetic structure.

5. In combination, a hollow tube of ferrite, means for applying electromagnetic wave energy to said tube for propagation therealong, and a magnet structure comprising four equally spaced poles distributed serially with alternate polarity around the periphery of and enclosing said tube.

6. In combination, a wave guide for the propagation of high frequency electromagnetic wave energy, a hollow tube of ferromagnetic material of low conductivity substantially coaxial with said wave guide and extending longitudinally in coupling relationship with the wave energy guided thereby, and a four pole magnet structure inducing four distinct magnet poles serially with alternate polarity around the periphery of said tube.

7. A circulator comprising two pairs of conjugately related wave guide terminals, and a series combination of a 90 degree nonreciprocal birefringent wave guide section and a 90 degree reciprocal birefringent wave guide section intercoupling said two pairs of terminals.

8. A circulator comprising two pairs of conjugately related wave guide terminals, and a series combination of a 90 degree nonreciprocal birefringent wave guide section and a 90 degree reciprocal birefringent wave guide section intercoupling said two pairs of terminals, said 90 degree nonreciprocal birefringent wave guide section including a hollow element of gyromagnetic material of low conductivity extending longitudinally in coupling relationship with the wave energy guided by said section and having four distinct spaced magnetic poles of consecutively opposite polarity simultaneously induced therein.

9. In combination, means for generating a dominant electromagnetic wave having a given plane of polarization, a circular wave guide coupled to said means, and a birefringent structure having its principal axis of birefringence located at 45 degrees with respect to said plane of polarization, said birefringent structure including a hollow gyromagnetic element disposed in the path of said wave and simultaneously magnetized to have four distinct peripherally spaced magnetic poles of consecutively opposite polarity.

10. In combination, a wave guide for the propagation of high frequency electromagnetic wave energy, a hollow element of paramagnetic material of low conductivity located in the path of wave energy guided by said guide, an eight pole magnetic structure enclosing said element, and electrical connecting means for inducing a rotating four pole magnetic field in said element.

11. In combination, a hollow conducting wave guide, a cylindrical liner of polycrystalline ferrite mounted within said wave guide, and a magnet having at least four radial poles mounted on said wave guide in a serially circumferential manner and energizing said liner with alternate polarities.

12. In combination, a wave guide for the propagation of high frequency electromagnetic wave energy, four spaced elements of paramagnetic material of low conductivity mounted in energy coupling relationship to the energy in said wave guide, and means for inducing opposite magnetic fields in successive elements of said four spaced paramagnetic elements.

13. In a birefringent wave guide component, a section of wave guide, a ferrite structure disposed in energy coupling relationship to the energy guided by said section, and a four pole magnet structure inducing four spaced zones of alternate polarity of intense magnetization in said structure.

14. In a transmission system for electromagnetic wave energy, a propagation path for supporting said wave energy in a plurality of polarizations, ferromagnetic material extending longitudinally along said path, said material being located in at least one pair of oppositely disposed positions in said path in coupling relationship with the transverse field pattern of said energy when propagating along said path, and means for applying a magnetic field to said material in each of said positions, said field for each position of a pair being in respectively different senses in space but in the same sense as viewed with relation to the magnetic field components of any given polarization of said wave energy when propagating along said path.

15. The combination according to claim 14, including material in at least one other pair of oppositely disposed positions, all of said positions being equally displaced in said path, and means for applying a magnetic field to said material in said other pair of positions in a sense opposite to said field of said one pair as viewed with relation to the magnetic field components of said given polarization.

16. The combination according to claim 15, including material between each of said heretofore named positions so that the total of said material substantially forms a hollow cylinder in said propagation path and wherein said magnetic field is supplied by four equally spaced and alternatively directed magnetic poles around said cylinder.

17. The combination according to claim 16, wherein said field is supplied by an eight pole-piece solenoid having alternative poles excited 90 degrees out of phase whereby four equally spaced magnetic poles are produced which rotate in space around said cylinder.

References Cited in the file of this patent

UNITED STATES PATENTS

| | | |
|---|---|---|
| 2,402,948 | Carlson | July 2, 1946 |
| 2,745,069 | Hewitt | May 8, 1956 |

FOREIGN PATENTS

| | | |
|---|---|---|
| 980,648 | France | Dec. 27, 1950 |

OTHER REFERENCES

Journal of Applied Physics, vol. 24, No. 1, January 1953, pages 109–110.

Kales et al.: "A Nonreciprocal Waveguide Component," Journal of Applied Physics, vol. 24, No. 6, June 1953, pages 816–17.

Turner: "A New Nonreciprocal Waveguide Medium Using Ferrites" Proceedings of the I. R. E., vol. 41, No. 7, July 1953, page 937.